(12) United States Patent
Kleiman

(10) Patent No.: US 6,771,400 B2
(45) Date of Patent: Aug. 3, 2004

(54) HYPERSPECTRAL SYSTEM FOR CAPTURING GRAPHICAL IMAGES

(76) Inventor: Larry Kleiman, 2417 Third Ave., Suite 302, Bronx, NY (US) 10451

( * ) Notice: Subject to any disclaimer, the term of this patent is extended or adjusted under 35 U.S.C. 154(b) by 234 days.

(21) Appl. No.: 10/100,609

(22) Filed: Mar. 18, 2002

(65) Prior Publication Data

US 2002/0159098 A1 Oct. 31, 2002

Related U.S. Application Data

(60) Provisional application No. 60/276,079, filed on Jun. 16, 2001.

(51) Int. Cl.[7] ............................................. H04N 1/46
(52) U.S. Cl. .................. 358/505; 358/515; 358/506; 358/513; 358/509; 356/317
(58) Field of Search ............................... 358/515, 505, 358/512, 513, 514, 506, 509, 518, 475, 487, 474, 901.1, 497, 909.1, 494, 496, 482, 483, 510, 539, 530; 356/318, 330, 456, 328, 326, 319, 320, 317, 419; 382/166, 167, 312, 318, 319, 323, 248, 253, 302, 240; 348/207.1, 408.1, 207.11, 209.99, 210.99, 266, 294, 96–100, 234, 235; 250/208.1, 334, 226, 339.07, 339.06, 458.1

(56) References Cited

U.S. PATENT DOCUMENTS

| | | | |
|---|---|---|---|
| 5,319,472 A | 6/1994 | Hill et al. .................... 358/500 |
| 5,384,901 A | 1/1995 | Glassner et al. ............. 345/591 |
| 5,502,580 A | 3/1996 | Yoda et al. .................. 358/518 |
| 5,506,696 A | 4/1996 | Nakano ....................... 358/504 |
| 5,539,517 A * | 7/1996 | Cabib et al. ................. 356/456 |
| 5,642,191 A | 6/1997 | Mende ......................... 356/326 |
| 5,724,135 A * | 3/1998 | Bernhardt .................... 356/328 |
| 5,926,283 A | 7/1999 | Hopkins ....................... 356/419 |
| 6,088,085 A | 7/2000 | Wetteborn .................. 356/5.01 |
| 6,160,618 A | 12/2000 | Garner ........................ 356/318 |
| 6,208,767 B1 | 3/2001 | Chapin ........................ 382/296 |
| 6,211,971 B1 | 4/2001 | Specht ......................... 358/1.9 |
| 6,269,182 B1 | 7/2001 | Ishii ............................ 382/165 |
| 6,337,923 B1 | 1/2002 | Yoon et al. .................. 382/167 |
| 6,495,818 B1 * | 12/2002 | Mao ............................ 250/226 |
| 6,552,788 B1 * | 4/2003 | Castle ......................... 356/326 |
| 6,646,743 B2 * | 11/2003 | Herman et al. .............. 356/364 |
| 6,690,466 B2 * | 2/2004 | Miller et al. ................. 356/326 |

* cited by examiner

Primary Examiner—Cheukfan Lee
(74) Attorney, Agent, or Firm—Katten Muchin Zavis Rosenman

(57) ABSTRACT

A graphical image scanner scans pixelated regions of a color image to measure light intensities in a plurality of hyperspectral bandpasses for each pixel. The scanner transforms the hyperspectral bandpass intensities into device-independent color representations for each pixel, using scientific color representations, for example, as defined in CIE-31 and CIE-76 colorimetry standards as devised by the Commission Internatonale de l'Eclairage (CIE).

29 Claims, 8 Drawing Sheets

HYPERSPECTRAL SYSTEM FOR CAPTURING GRAPHICAL IMAGES

CROSS-REFERENCE TO RELATED APPLICATION

The present application claims priority under 35 U.S.C. §119(e) from U.S. Serial No. 60/276,079, filed on Mar. 16, 2001, which was filed by an inventor common to the present application, and is hereby incorporated by reference.

FIELD OF THE INVENTION

This invention relates to the field of technical reproduction of graphical images. In particular it relates to a hyperspectral system for measuring and transforming light from individual pixel elements, or pixels, that comprise an image, into a standardized representation where each pixel's notation is a location in a perceptual color space defined by the Commission Internationale de l'Eclairage (CIE).

BACKGROUND OF THE INVENTION

Conventional apparatus for capturing colored graphical images utilize a method based upon an industrial implementation of a central color science concept, the Trichromatic Generalization, which explains how colors mix and match. In the conventional scheme, a coordinate system characterized as a Device Dependent Color Space (DDC) utilizes linear mixtures of three arbitrary primary colors to match the color of individual pixels of the original.

Color Science evolved over more than 300 years of experimentation and observation and is called colorimetry. A complete review of colorimetry or the specification of human color perception is beyond the scope of this document. However, key physiological, physical and psychological factors central to determining any calorimetric system's accuracy and precision are reviewed.

The origin of the scientific Trichromatic Generalization has its basis in human physiology. The sensation of color is a complex interaction of the human nervous system with light, electromagnetic radiation found between the wavelengths of 300 nm and 830 nm (as illustrated by FIG. 1). Ordering the psychological designations of color perception creates the visible spectrum, from short to long wavelengths, violet, blue, green, yellow, orange, and red. The color matching rules of the Trichromatic Generalization are used to predict how mixtures of the different wavelengths are perceived by humans. Complicating the mechanical aspects of color perception are visual system anomalies.

The human eye's lens brings different wavelengths of light to focus at different distances behind the lens and absorbs almost twice as much blue light as yellow or red, resulting in a relative insensitivity to shorter wavelengths, a condition exaggerated by age. The light that finally passes through the eye strikes the retina, a small area at the back of the eye densely packed with individual light sensitive receptors connected to the optic nerve, the conduit that transmits and processes visual sensations from the eye to the visual cortex in the brain. It has been shown the light sensitive photoreceptors are of two kinds, rods, which function at night or at very low light levels, and cones, which function under daylight conditions and are the sole source of color perception sensations in humans. The cones are circularly situated at the center of the eye's focal area, the fovea, with the rods forming a ring around the cones.

The notion of "tri" associated with the Trichromatic Generalization arises from the relative sensitivity of the three different cone types generally accepted to be found within the fovea. About 64% of cones exhibit peak sensitivity to 575 nm wavelength light and are said to be red sensitive, though the 575 nm bandpass is actually perceived as yellow. Thirty two percent of cones are considered green, most sensitive to 535 nm light, and only two percent are blue, having a peak response at about 445 nm. It is generally believed analyzing the ratio of the neural activities generated by visually stimulating the three different photoreceptors is the method by which the human visual system interprets color. In practice, it has been shown that the channels of information from the three cones are transformed into three new so-called opponent channels, transmitting a red to green ratio, a yellow to blue ratio and a brightness factor, based upon red and green only, to the brain's visual cortex (as illustrated in FIG. 2). The physiological sensations produced by visual stimulus is thought to be correlated with stored psychological perceptions, creating color vision.

The above described physiology allows perception of the physical aspects of color, electromagnetic radiation found between the wavelengths of 380 nm and 780 nm, referred to here as human-visible light. Physically, color perception varies according to the wavelength of the visual stimulus. Wavelength is calibrated in nm (nanometer) denominated units, with groups or multiple wavelengths described as bandwidth. When the bandpass of the bandwidth is narrow, the resulting perceptions are associated with pure, or highly saturated, color. As the observed bandpass widens, the color appears less pure. Observers with normal color vision generally identify pure blue as light with a wavelength of about 470 nm, pure green as light with a wavelength of about 505 nm, pure yellow as 575 nm light, and pure red as 610 nm light. However, individual observers often respond differently to the same specimen, so what is a pure color to one may not be perceived that way by another observer.

Besides wavelength, other important physical attributes of visible light are luminance, illuminance, transmittance (reflectance) and metamerism. Luminance accounts for light emitted, such as from a computer display, calibrated in units that reflect the eye's uneven sensitivity to different wavelengths. Illuminance is a measurement of the amount of light that falls on an observed object and transmittance (reflectance) is the measurement of light photons that are absorbed and regenerated as new photons in proportion to the amount of original photons that transmitted through (reflected off) the surface of the object. Various wavelengths of light that are absorbed and retransmitted through (reflected off) a measured image (or specimen) and presented as a percentage of the wavelengths of light that initially struck it can be described as the image's (specimen's) characteristic spectral transmittance (reflectance) curve (for example, as illustrated by FIG. 3), and plotting and transforming this curve for the purpose of matching colored specimens is a basic aspect of colorimetry. For brevity, we will hereforward refer to transmittance and reflectance simply as transmittance.

It is useful to consider that the reproduction of a colored image may be thought of as an exercise in color matching which takes into account the spectral power distribution of the light source (ie: viewing conditions) illuminating the original, the characteristic curve of the original, the power distribution of the light source illuminating the reproduction, and the characteristic curve of the reproduction. When the characteristic curve of the source's power distribution is combined with the spectral transmittance of the specimen, a visual stimulus is created which triggers color perception. Mathematically characterizing the color perception triggered by the combination of a source's power distribution and a specimen's transmittance curve is a necessary first step in successfully reproducing the perception.

There is, however, a phenomenon that impacts color perception and therefore color reproduction; metamerism. To illustrate the phenomenon, consider two specimens with identical characteristic curves. They will appear to the average observer to match under any source of illuminance. Now, consider two specimens with different curves. They will appear to vary with regards to one another as the source of the illumination is varied. However, there can be two specimens that appear to match despite having different characteristic curves. This is metamerism. An example of metamerism is when the two specimens with different characteristic curves are observed under different sources of illumination, and a match is observed under one of the sources (as illustrated, for example, in FIG. 4). Because the reproduction of colored images entails taking into account different viewing conditions and media, the mathematical characterization of a color perception destined for reproduction must take into account metameric matches. A color measurement system capable of identifying and predicting metamerism is the CIE system (devised by the Commission Internationale de l'Eclaimage), and its mathematical model will be described below.

The above described physiological and physical attributes of color are considered the objective factors effecting color perception and, hence, color reproduction. There are also subjective psychological factors to consider, the most important one being hue. Hue is associated with the wavelength of a visual stimulus, though hue can not be directly measured, as can the stimulus' wavelength. Psychological hue is comprised of the names of the colors of the visible spectrum. Two human observer's past experiences with colors and color names would allow them to agree a particular visual stimulus was, for example, blue, but disagree regarding which of a multitude of blue stimuli was the "bluest."

Hue exhibits a non-linear characteristic known as saturation, which is associated with the bandwidth of the visual stimulus, and was previously described as color purity. Different hues of equal bandwidth do not appear to an observer to be equally saturated. And a hue can be desaturated by mixing it with a neutral hue such as white or gray, or with an opponent color.

Another non-linear psychological factor of hue is described as lightness, which scales hue from dark to light and is associated with a specimen's ability to transmit light. The more light a specimen's surface transmits, the lighter its hue appears. Brightness is the psychological factor of hue which scales hue from bright to dark and is associated with the intensity of the light source illuminating the specimen. Brightness and the previously described luminance are both associated with the perceived effects of light intensity, but brightness is a perceptual experience while luminance is a measurement modeled mathematically by the so-called luminance efficiency function defined by the CIE. This function describes the eye's sensitivity to wavelength (as illustrated, for example, by the graph of FIG. 5).

Two final psychological phenomena especially of concern in formal color matching are color constancy, or the preservation of perceived hue relationships despite changes in viewing conditions, and color contrast, or the shifting of perceived hue caused by adjacent hues.

The above described physiological, physical and psychological factors must be accounted for in any system purporting to be a meaningful model of color and by extension, a useful model upon which to base a system for graphical imaging.

Color models mathematically correlate physiological sensations of color perceived by the human eye by assuming that human perception of the color of any pixel in an image may be quantified by three numbers. These numbers are the intensity of three primary color sources whose outputs either (a) overlap to match the pixel color, or (b) two of whose outputs overlap to match the color of the pixel which is itself overlapped by the third primary output. The former case is described as the pixel color equaling a sum of the three primary color outputs; the latter case is described as the color of the pixel matching a sum of the two primary outputs minus the third primary output.

The three primary colors forming the basis for quantifying colors are not unique. They may be chosen almost arbitrarily, the important points being that three suffice and none of the primary stimuli can be color matched by a mixture of the other two. The three primary colors may be considered to form a color model, a basis in a three dimensional linear vector space. A different set of three primary colors is simply a different basis within the linear color space. The coordinates of a color in a model with respect to each basis are simply the intensities of the basis primary colors whose superposition (positive or negative) matches the color. The Trichromatic Generalization assumes linear transformations suffice to describe a change in intensity and all device dependent color models are linear. However, the CIE system includes non-linear color model transformations and procedures to account for different viewing conditions and visual phenomena such as metamerism and color contrast. And, to simplify color matching, the CIE system uses mathematical means, imaginary primaries designated X, Y and Z, to eliminate color matching possibilities that require a minus primary value to make a match. The X, Y and Z primaries create a superset of color which includes all colors a human might perceive. This is a key difference as compared to the physical primaries integrated into current graphical imaging systems, whose color gamut (or range of producible colors) is a subset of human color perception.

The three primary colors X, Y and Z utilized by the device independent CIE color model are mathematical abstractions based upon statistical analysis of the response of different observers to color specimens compared in a highly standardized manner. For example, the CIE has defined a standard manner for observing a color match which requires observing a structure free specimen field that subtends 2° of arc when positioned 45 cm (18 inches) from the eye's iris. By correlating the results of these observations with precise and accurate measurements of a visual stimuli's physical color properties, a device independent system able to correctly measure human color perception is created.

Devices currently utilized to quantify color for reproduction means use color systems that require actual samples of real primary colors (usually red, green and blue, i.e. R, G, B) be present to make measurements. Light is transmitted through a colored object and through filters that isolate the primary colors. Upon exiting the primary filters the light, effected by the optical density and color of the object, as well as the three primary color filters, is measured and noted as three integer values, one each for the R, G and B primary component created by the device for the object measured. This method creates a measurement process tied to a specific physical color space, with all the inherent color gamut limitations of physical rather than imaginary primaries. The methods and techniques used to create and measure the R, G and B components of a physical color space vary from vendor to vendor and are without any common standards.

Although a convenient way to describe colors, the limitation of any device dependent system is that regardless of how the three primary colors are chosen, observer metamerism effects (where two objects appear to some observers or devices to have the same color, but to other observers or devices the same objects do not match) cannot be eliminated. Values expressed by a device dependent color system are accurate only within a truncated color space and only if the exact same filters, lights, inks or pigments used to render a particular color are used as the physical primaries in the measuring device, which is an impossibility. That being the case, it has been recognized that more information than is contained in a device dependent color model is needed to produce accurate color reproduction.

Despite it's known inaccuracy, device dependent color-based measuring and rendering systems have been integrated into virtually all industrial and commercial applications related to the processes that are called upon to reproduce full color images, such as printing, photography and television. Over generations the conflict of accurately measuring and rendering with physical color systems has lead to extensive trade practices being established. These practices, commonly referred to as "color correction," integrate human judgment with the physical color systems in a way that requires humans to make decisions to resolve or mask the inherent limitations of a physical color system. In physical color image scanning methods, humans are expected to compensate for differences between the color content of the original image, what a scanner can capture of the original color content, how the scanner describes what it captured, and how the captured data must be adjusted for use by various digital, xerographic and lithographic rendering processes.

There exist however sophisticated quantitative parameterizations of color that are available to improve the process for color reproduction. Two such standards are 1) the ASTM (American Society for Testing and Materials, West Conshohocken, Pa.) standards E 1164-94, *Standard Practice for Obtaining Spectrophotometric Data for Object-Color Evaluation*, and E 308-95, *Standard Test Method for Computing the Colors of Objects by Using the CIE System*, and 2) the CIE (Wien, Austria) standards CIE 15.2-1986, *Colorimetry, 2nd Edition* (ISBN 3 900 734 00 3), and ISO/CIE 10526: *Colorimetric Illuminants* and ISO/CIE 10527: *Colorimetric Observers*. The ASTM standard is a truncated variation of the CIE standard, which decomposes a color into saturated monochromatic components of known bandwidth, applies mathematical operators to each component and integrates the result to arrive at a set of values characterizing the color.

The ASTM standard, in turn, is the basis for a third, even more abridged graphic arts standard for measuring individual color specimens, CGATS.5–93, *Spectral Measurement and Colorimetric Computation for Graphic Arts*. The standard is published by The Committee for Graphic Arts Technologies Standards, a group accredited by the Image Technology Standards Board, ITSB, of ANSI, and closely associated with the Working Groups of ISO/TC130 (CGATS, c/o NPES, Reston, Va.).

By agreement, the CIE, (Commission Internationale de l'Eclairage), since 1913, has developed standards regarding how the Trichromatic Generalization is interpreted, as well as how color is measured and described. The underlying premise of the CIE system, referred to as CIE-31, is that the stimulus for color is provided by the proper combination of a source of light, an object, and an observer. In 1931 the CIE introduced standardization of the source and observer and the methodology to derive numbers that provide a measure of a color seen under a standard source of illumination by a standard observer (source and observer models are respectively illustrated by FIGS. 6, 7). This standardization forms the foundation of modern colorimetry. CIE-31 uses a specimen's Characteristic Curve for the calculation of Tristimulus Values X, Y, and Z and Chromaticity Coordinates x and y. The CIE-76 recommendations establish transformations of the X, Y, and Z Tristimulus Values into nearly visually uniform color scales such as CIELAB, and also established a method to quantify differences between two color specimens.

Chromaticity Coordinates x and y are the result of linear transforms of X, Y and Z and, when plotted, locate visible colors in a two-dimensional horseshoe-shaped graph representing the CIE 1931 xyY color space. While only two of the three dimensions of color are shown on a Chromaticity Diagram (see FIG. 8), a three-dimensional version of the diagram is often made by plotting an axis for Y rising from the illuminant point of the diagram (see FIG. 9).

CIELAB ($L^*a^*b^*$), the result of a non-linear transformation of X, Y and Z, is an opponent-type system that assumes a color cannot be red and green at the same time, or yellow and blue at the same time, though it can be both red and yellow (ie: orange) or red and blue (ie: purple). Therefore, a specimen's redness or greenness can be expressed as a single number, called $a^*$, which is positive if the color is red and negative if it is green. It follows that yellowness or blueness is designated by the coordinate $b^*$, positive for yellow and negative for blue. The third coordinate, $L^*$, is the lightness of the color. The CIELAB color space (as illustrated by FIG. 10) is expressed graphically by plotting in rectangular coordinates the quantities $L^*a^*b^*$.

The full benefit of the CIE system has not been taken advantage of by the graphic arts industry with regards to image scanning. Even manufacturers of printing inks, photographic dyes and color monitors for computers and televisions utilize ASTM-based standards, not the more complex and exact CIE standards.

The less stringent ASTM industrial standards for color measurement truncate the wavelength range between 360 nm and 780 nm and support bandpasses of 10 nm and 20 nm for a variety of illuminants. The least stringent standard for color measurement, CGATS.5–93, also truncates its spectrum between 360 nm and 780 nm, and supports only 10 nm and 20 nm wide bandpasses for one type of illuminant. Devices capable of measuring 1 nm and 5 nm wide bandpasses of radiant energy are sometimes referred to as hyperspectral in the literature, while devices capable of measuring 10 nm or 20 nm wide bandpasses of radiant energy are referred to as multispectral devices.

To summarize, at this time commercially available Trichromatic color image scanners generally employ device-dependent color (DDC) densitometry techniques. Examples of such conventional systems include, for example, Agfa Corp.'s (Ridgefield Park, N.J.) AgfaScan T5000 Plus, Heidelberg USA's (Kennesaw, Ga.) Primescan D8400, Creo Americas, Inc.'s (Bedford, Mass.) EverSmart Supreme, and Imacon, Inc.'s (Redmond, Wash.) Flextight 848.

A device disclosed in U.S. Pat. No. 5,319,472, issued Jun. 7, 1994 and hereby incorporated by reference, describes an abridged spectrophotometer for image capture. This system utilizes interference filters to separate light into overlapping bands of radiant energy. These bands, which span a truncated portion of the spectrum usually associated with human color perception, are too wide to comply with the aforementioned scientific and industrial standards. The results of such scanning may be notated using the mathematical aspects of the CIE's spectrophotometric system, but such data can only indirectly, and with limited accuracy, be in agreement with actual CIE-compliant, hyperspectrally observed data.

Accordingly, it would be desirable for a graphical image scanner to be configured for capturing colored images in accordance with scientific, device-independent colorimetry standards that are compliant with international standards such as CIE-31 and CIE-76.

SUMMARY OF THE INVENTION

A novel method and apparatus is disclosed for creating a master of a graphical image in accordance with scientific, device independent colorimetry standards (here, the term "master" is used to connote a highly accurate and pure representation of the image). A graphical image scanner according to the present invention comprises a light source to illuminate the graphical image, a collector to segment the image into a plurality of pixels and collect light emanating from the plurality of pixels, a hyperspectral analyzer to divide the collected light into a plurality of hyperspectral bandpasses and measure a light intensity for each of the hyperspectral bandpasses, a calculator to transform the measured light intensities for the plurality of hyperspectral bandpasses into a device-independent representation of color for each of the pixels, a processor with stored program control to format the device-independent color representations for the plurality of pixels as a digital data file, and a memory for storing the digital data file. The hyperspectral bandpasses define a continuous spectrum characterized by wavelengths ranging between 360 and 830 nanometers, in accordance with color measurement standards established by the Commission Internatonale de l'Eclairage (CIE). Each hyperspectral bandpass is characterized by a substantially unique and non-overlapping selection of continuous wavelengths from the spectrum. The light intensities for the hyperspectral bandpasses are transformed using CIE-devised parameters and algorithms to produce a device-independent color representation for each pixel in the graphical image.

BRIEF DESCRIPTION OF THE DRAWING

A more complete understanding of the invention may be obtained by reading the following description of specific illustrative embodiments of the invention in conjunction with the appended drawing in which.

In the various figures, like reference numerals designate like or similar elements of the invention.

DETAILED DESCRIPTION OF PREFERRED EMBODIMENT

The following detailed description includes a description of the best mode of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

Figure 1:
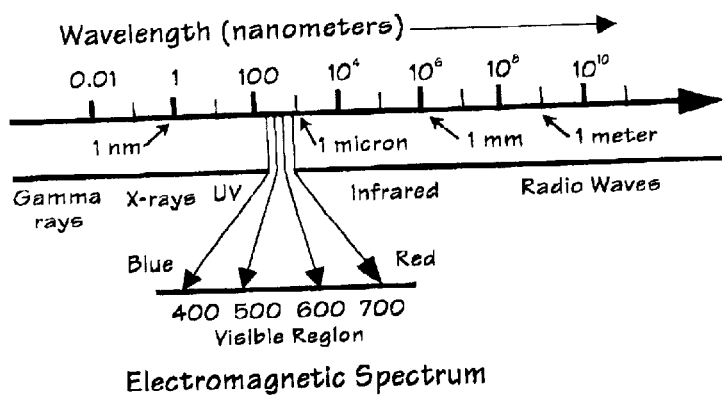
FIG. 1 illustrates the visible spectrum.
Figure 2:
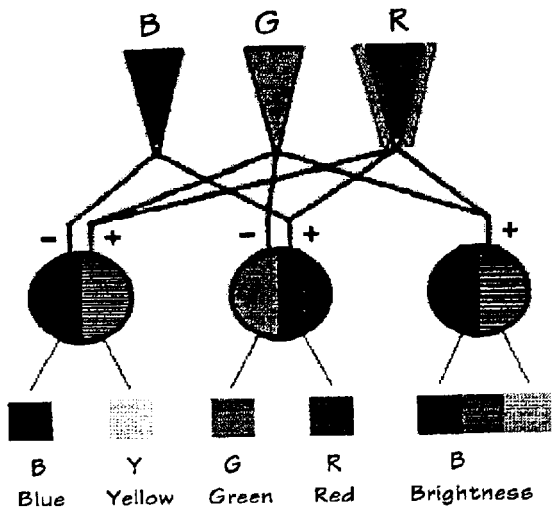
FIG. 2 illustrates an opponent visual system of human color perception.
Figure 3:
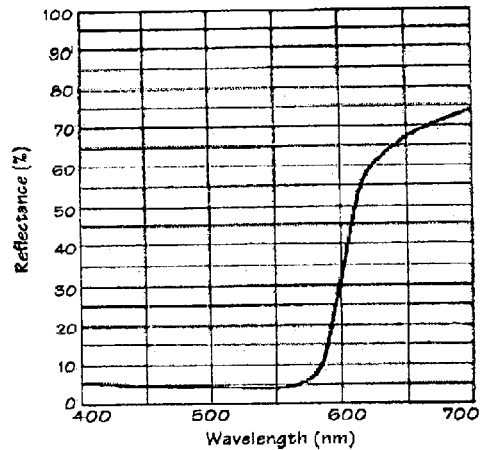
FIG. 3 illustrates a characteristic reflectance curve.
Figure 4:
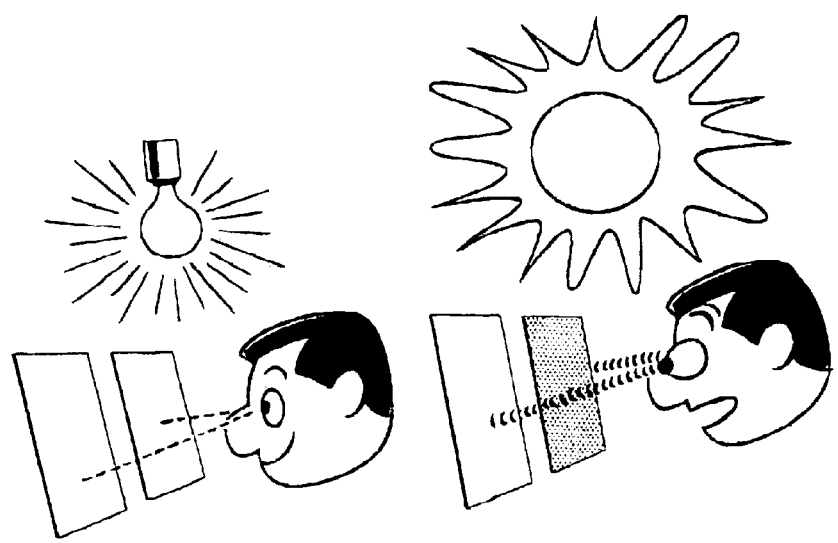
FIG. 4 provides an illustration of metamerism.
Figure 5:
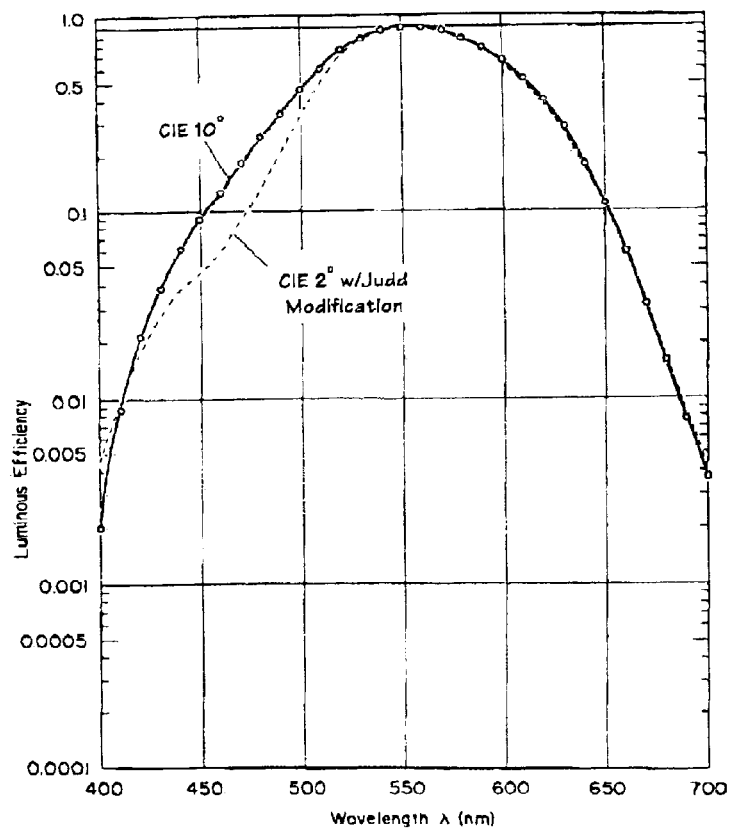
FIG. 5 shows human sensitivity to wavelengths of light as illustrated by observer luminance efficiency functions.
Figure 6:
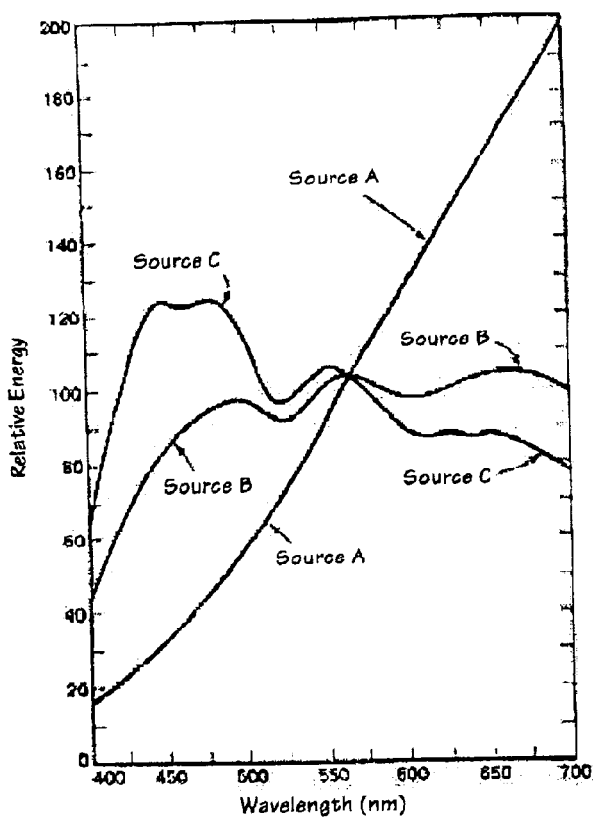
FIGS. 6, 7 illustrate CIE source and observer standards.
Figure 7:
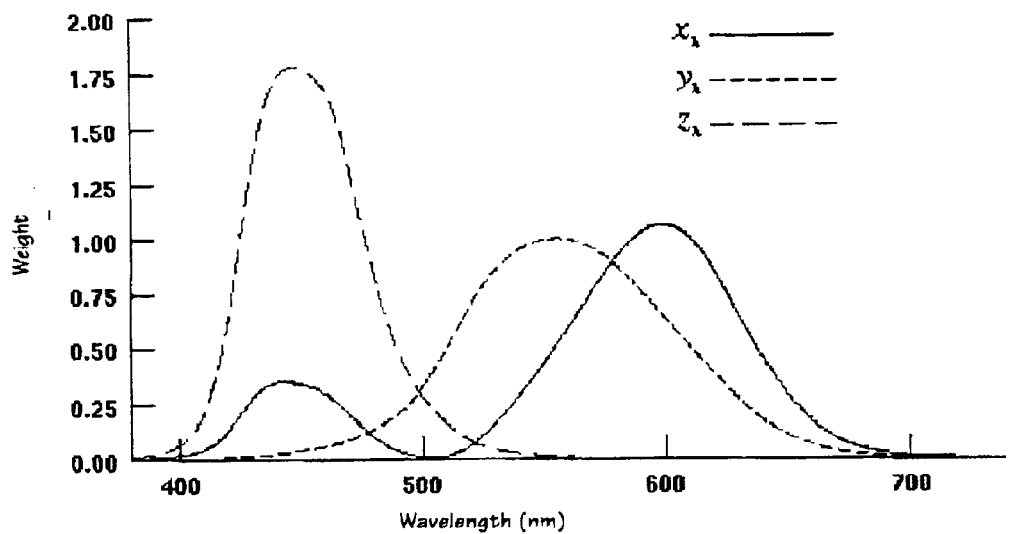
Figure 8:
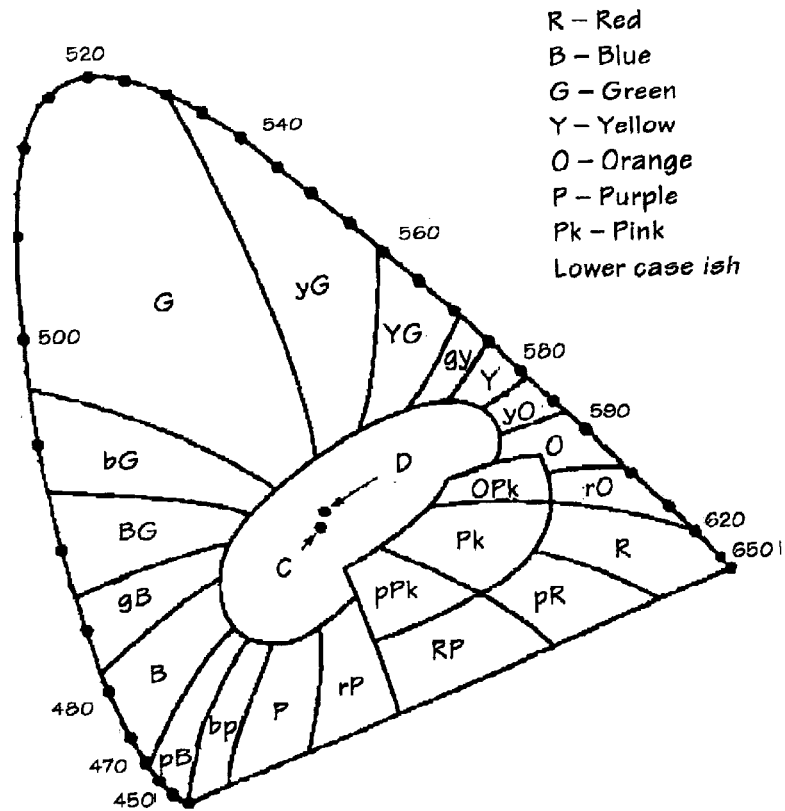
FIGS. 8, 9 illustrate CIE chromaticity diagrams.
Figure 9:
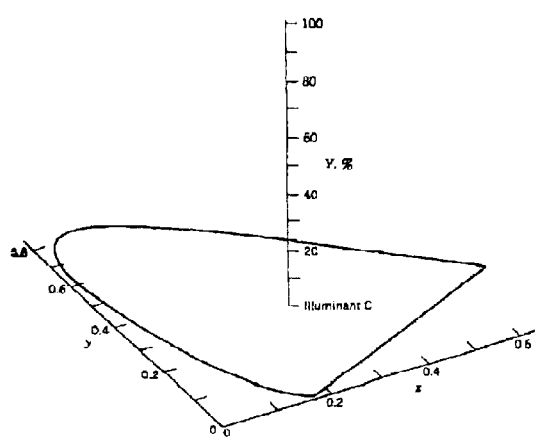
Figure 10:
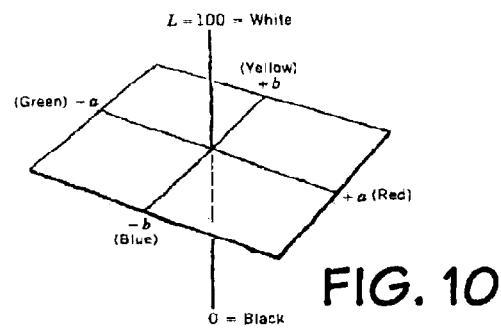
FIG. 10 illustrates the CIELAB color space.
Figure 11:
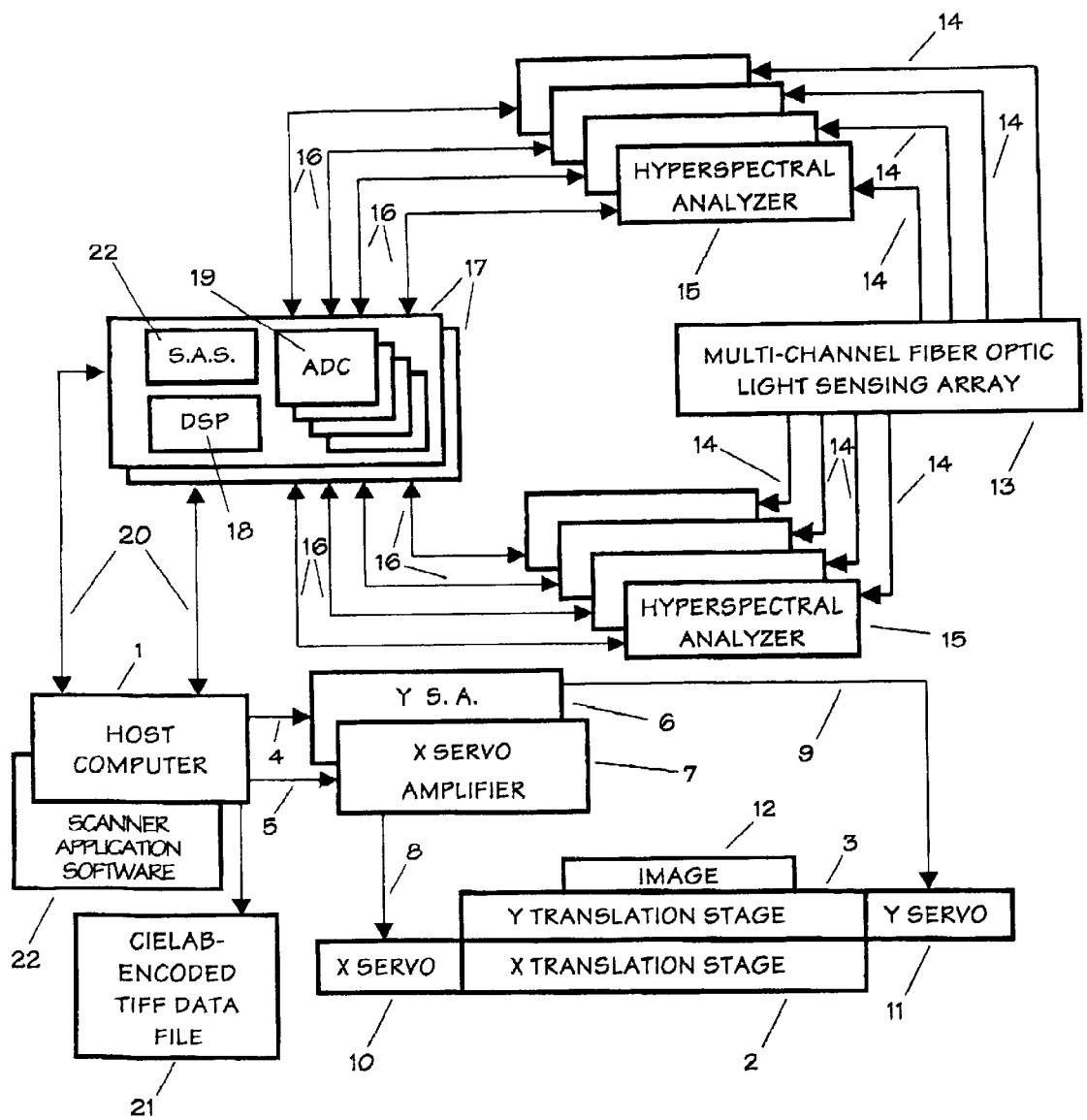
FIG. 11 provides a diagram illustrating the principle components of the present invention.
Figure 12:
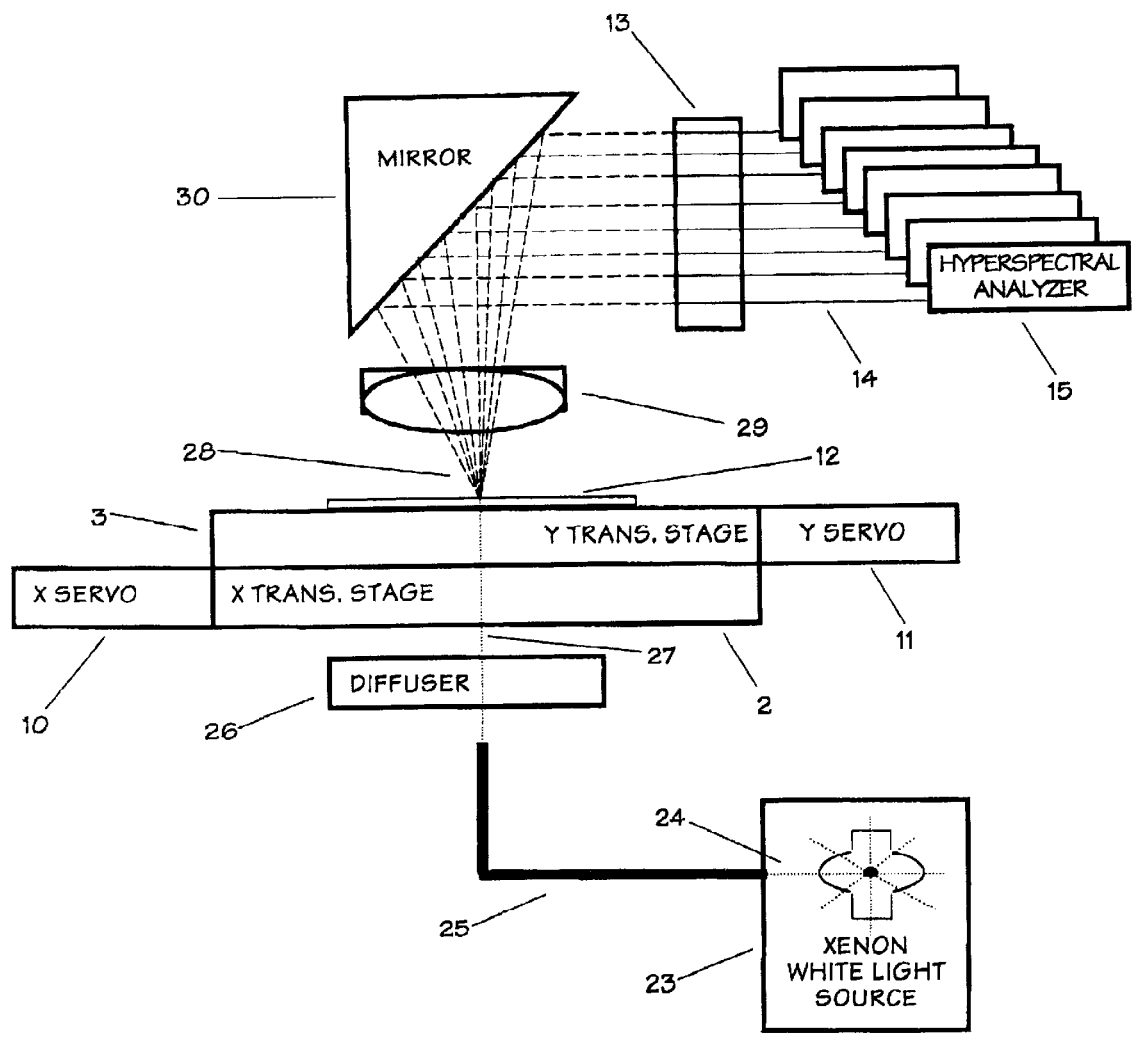
FIGS. 12 and 13a–13c provide further details of the components of FIG. 11.

A graphical image scanner 100 organized according to the principles of the present invention is illustrated in FIG. 11. The scanner 100 masters an image 12 by dividing the image into a grid of x and y coordinates, with each coordinate pair representing a picture element, or pixel. The pixels are optically created as sections of the image containing the pixels are systematically focused into a Multi-Channel Fiber Optic Light Sensing Array (MCFOLSA) 13, where each channel represents one pixel. The spatial resolution of a pixel is determined by the enlargement factor of the focusing optics 29 (as shown in FIG. 12) and the image scanning resolution is determined by the step, or the incremental distance traveled by the X translation stage 2 and Y translation stage 3 as these stages mechanically position the image along horizontal and vertical imaging axes of the system. The scanning process, or movement and measurement of the image, occurs in a three part automated cycle: the image settles, the system makes a series of spectral power distribution measurements for a number of pixels in parallel, and then the image is moved to a next appropriate location. An entire cycle might typically take 10 milliseconds (ms).

As shown in FIG. 11, a host computer 1 provides a known hardware and software environment that acts as a backplane for the scanning application's specialized hardware and software subsystems. The scanning application software 22 (including a Graphical User Interface (GUI), illustrated in FIGS. 14, 15) resides and operates on the Host computer 1. Portions of the scanning application software 22 may also reside and operate on other devices such as Multi-function Data Acquisition Component (MDA) 17.

Figure 14:
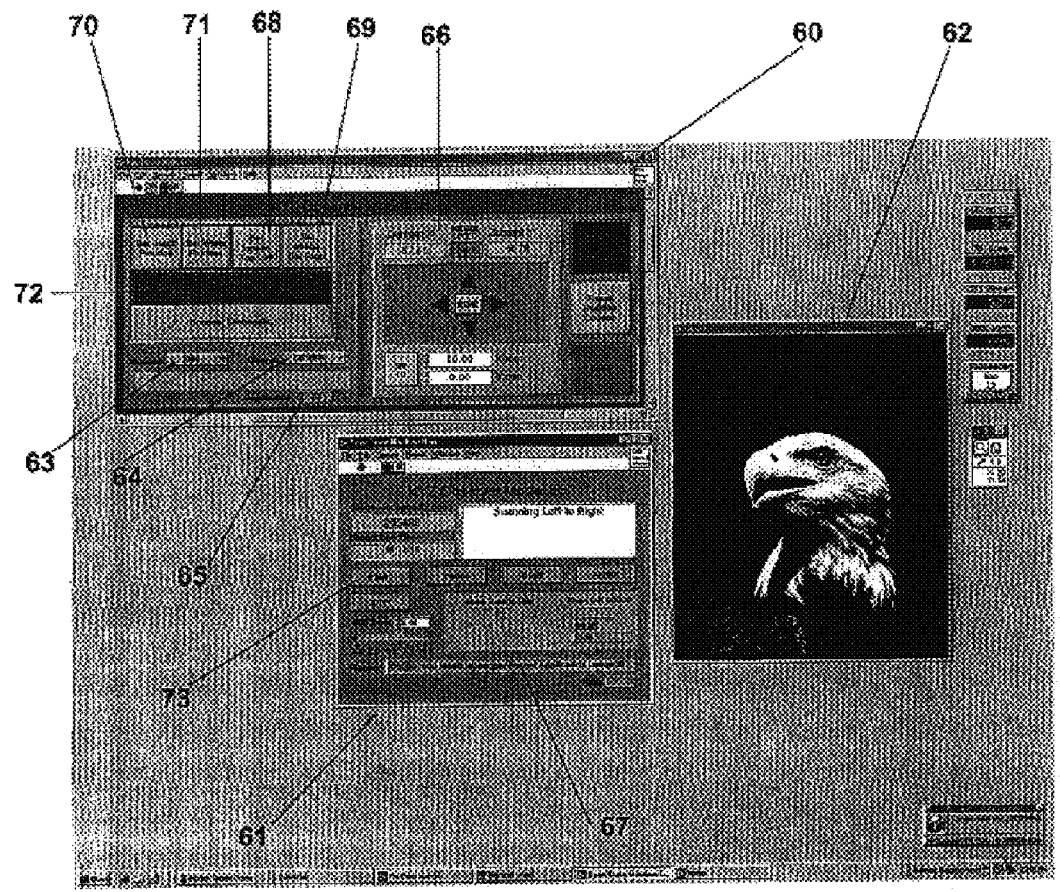
FIGS. 14, 15 illustrate elements of a graphical user interface (GUI) of the present invention.
Figure 15:
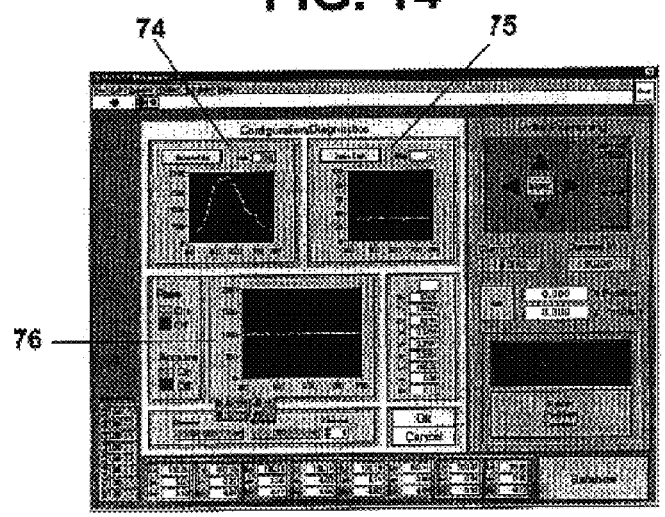

As illustrated in FIG. 14, the scanner's GUI may be displayed within windows 60, 61 and 62 on a Host monitor, and may be controlled for example by a mouse and keyboard (not shown). The GUI allows an operator direct control over scanner setup, including for example selection of illuminant and observer tables 63, 64 and selection of a scanning spatial resolution setting 65. The GUI further provides operator controls 66 for manual positioning of the Mechanical Motion subsystem, for file naming and saving (67), setting of scan start and scan stop locations 68, 69, and setting of White Point and Black Point measurement locations 70, 71. The GUI also displays the image 62 being scanned in real-time.

An optical subsystem uses a Xenon white light source 23 as shown in FIG. 12, operating for example between the wavelengths of 360 nm and 830 nm. Such light sources are available, for example, from ILO Electronics of Quickborn, Germany. White light energy from light source 23 is directed by a fiber optic cable 25 through a diffuser 26 and into an optical path directed through the translation stages 2, 3 and then through a lens 29 and mirror system 30, finally striking optical strands 14 integrated into MCFOLSA 13. Suitable commercial embodiments for optical components 26, 29 and 30 are available, for example, from Melles Griot of Irvine, Calif.

Figure 13A:
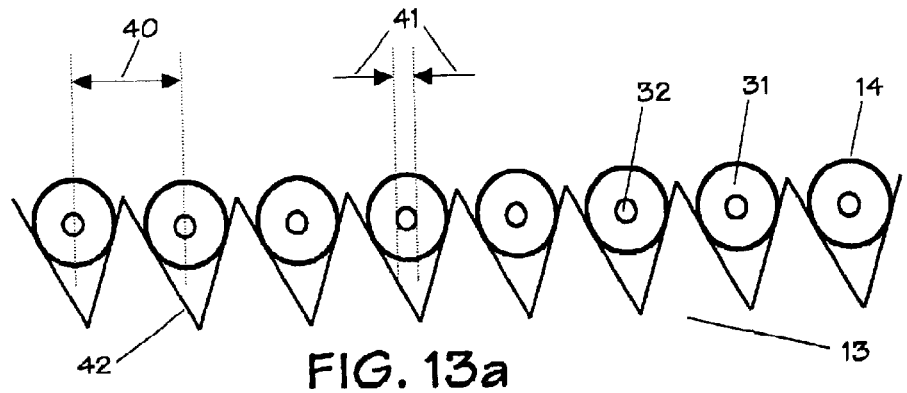
Figure 13B:
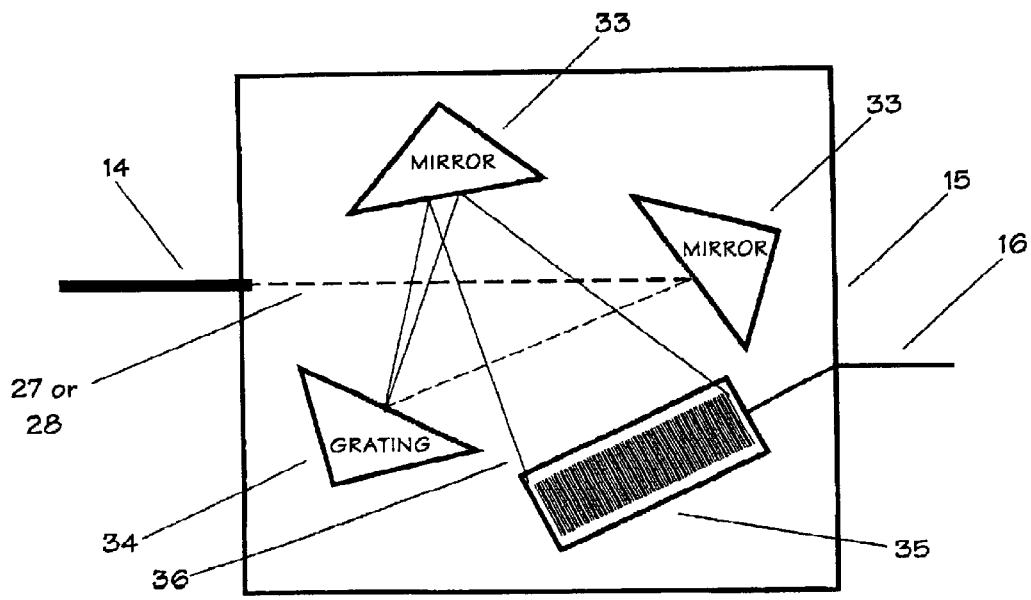

As shown in FIG. 13b, a hyperspectral analyzer 15 uses mirrors 33, a grating 34 and a linear light sensor 35 to direct and disperse the light received from optical fiber 14 into a hyperspectral ray 36 for sensing and conversion by linear light sensor 35, as required, into analog signals that are sent to the multi-functioning Data Acquisition Components (MDAs) 17, via Control Lines 16. Suitable commercial embodiments for MCFOLSA 13, grating 34 and linear light sensor 35 are available, for example, from Ocean Optics, Inc. of Dunedin, Fla. Suitable commercial embodiments for MDAs 17 are available from National Instruments, Inc. of Austin, Tex.

Before scanning an image, the disclosed system is calibrated for white and black levels. This requires measurement and adjustment of the output of the Xenon white light source 23 of FIG. 12 to determine and set maximum (100%) and minimum (0%) light intensity levels, or optical energy levels, that the scanning system can accurately and precisely output and measure. These levels are called the White Point (100%) and Black Point (0%) levels, and they are used to calculate relative light intensity levels (or spectral power distribution) of the normalized white light 27 output by the Xenon white light source 23, at each of the CIE-defined hyperspectral bandpasses.

As illustrated in FIG. 14, an operator uses the GUI 60 to issue a Start Scan command 72 to the scanner application software 22. The operator then selects, in any order, commands to select a Scanning Start 68 at the upper left corner of the image, and a Scanning Stop 69 at the lower right corner of the image. The operator may also select Illuminant and Observer tables 63, 64, a Scanning Spatial Resolution setting 65, and White Point and Black Point data locations 70, 71. Then the operator issues Start Command 73 and supplies a File Name and Location 67 for storing the standard digital data file (for example, as the CIELAB-encoded TIFF-formatted file 21 of FIG. 11), and scanning application software 22 automatically processes the image. Scanning application software 22 uses operator-supplied scanner setup selections 65, 68 and 69 to define the image as a two dimensional grid representing the location of all the pixels that comprise the image. The software 22 uses the grid as its guide for stepping the operator-defined image systematically through the optical path and the three step scanning cycle. The resulting measurements may be preferably transformed, for example, into CIELAB values and saved as a TIFF-formatted file (shown as file 21 in FIG. 11).

Figure 13C:
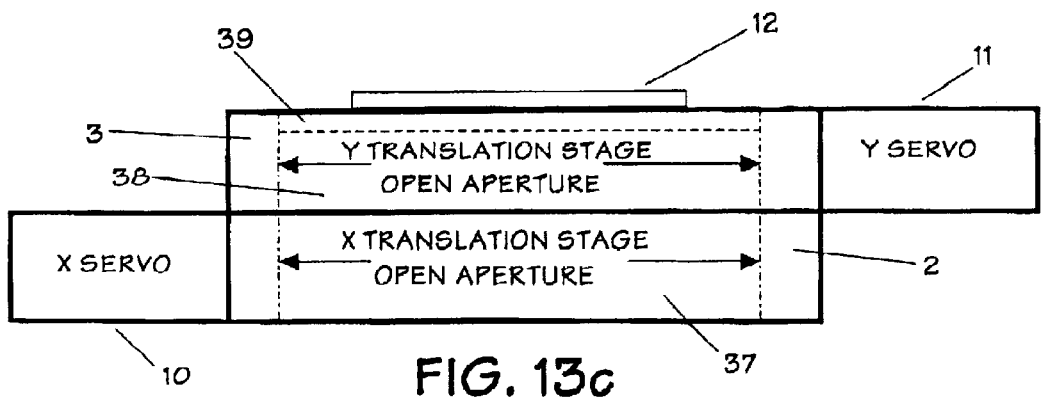

In the embodiment of FIG. 12, a continuously burning Xenon lamp is used in white light source 23 to provide ample light energy output between the CIE specified wavelengths of 360 nm and 830 nm. The output 24 of the source 23 is directed into a fiber optic light guide 25 which directs the white light through a diffuser 26 and into an optical path that orthogonally traverses the X and Y imaging planes formed by the X and Y mechanical translation stages 2, 3. As shown in FIG. 13c, the stages have open apertures 37, 38 to allow the diffused white light 27 of FIG. 12 to pass through them, and a clear window 39 is fitted in the open portion of the stage 3 as a means to secure a transparent image 12 to the stages. The window 39 may preferably comprise a clear sheet material such as glass. Those skilled in the art will easily recognize that, with minor positioning modifications, light source 23 can be made to either reflect light off or transmit light through image 12.

Under the control of the scanner application software 22 of FIG. 11, which synchronizes the measuring and transformation processes, the translation stages 2, 3 are able to move the image 12 through the optical path using the spatial patterns determined by operator setup selections. Through the host computer 1, the scanner application software 22 manages the mechanical motion of the X translation stage 2 and Y translation stage 3 by issuing commands and digital signals through control line 4 for Y servo amplifier circuit 6 and through control line 5 for X servo amplifier circuit 7. X servo amplifier circuit 7 and Y servo amplifier circuit 6 are directly connected, through respective control lines 8 and 9 to X stage servo motor 10, and Y stage servo motor 11, in order to position the stages 2 and 3 and therefore move the image 12 into and through the optical path of MCFOLSA 13, which optically breaks the image into pixels. Accordingly, pixels may individually and in predetermined groups be brought into the system's optical path and focused through lens 29 and mirror 30 of FIG. 12 into MCFLOSA 13 to allow for measurements at predetermined spatial resolutions. Suitable commercial embodiments for servo amplifiers 6, 7 and servo motors 10, 11 may be obtained, for example from Kollmorgen Inc. of Radford, Va. Suitable commercial embodiments of translation stages 2, 3 may be obtained from Dyna Optic Motion of Laguna Hills, Calif.

As shown in FIG. 12, MCFOLSA 13 directs the light for individual pixels through fiber optic strands 14. As shown in FIG. 13a, each strand 14 is composed of an outer cladding 31 and an inner fiber guide 32, with the inner fiber guides 32 featuring a typical guide diameter 41 of 50 microns ($\mu$m) and a typical linear spacing 40 between inner guides 32 of 200 $\mu$m. At the end of the array 13, open and exposed to light transmitted through the image 12, the strands 14 are fabricated into a rigid harness 42. Each strand 14 terminates in one of a multitude of individual hyperspectral analyzers 15 of FIG. 12 operating to convert the pixel's optical signal into an analog signal. Through individual control lines 16, as shown in FIG. 11, each hyperspectral analyzer 15 is connected to one of a multitude of Multi-functioning Data Acquisition components (MDAs) 17 which include Digital Signal Processors (DSP) 18, Analog to Digital Converters (ADC) 19, and Scanner Application Software 22 for command and control of the components 18 and 19. The MDAs 17 connect directly into one of a multitude of slots 20 found on host computer 1.

The MDAs 17, under the control of scanner application software 22 resident in both the MDAs 17 and the Host 1, process the analog signals from each hyperspectral analyzer 15 into digital data representing a percentage of the White Point value actually transmitted by each pixel, at each of the CIE-designated wavelength bandpasses. This percentage is the relative amount of light energy transmitted through each pixel at the known wavelengths (transmittance T), and is a necessary precursor to making color measurements in accordance with CIE standards.

As shown in FIG. 12, diffused white light 27 is directed to the image 12, and the resulting light 28 transmitted through the image 12 is focused using a lens 29 and mirror 30 into one of a multitude of individual fiber optic strands 14 arranged at one end as MCFLOSA 13, thus creating a parallel measuring technique for optically converting the image into individual pixels. Opposing ends of the strands 14 each use standard industrial connectors to terminate into one of a multitude of hyperspectral analyzers 15, which as shown in FIG. 13b, use mirrors 33, a grating 34, and a linear light sensor 35 to disperse the pixel's light into the spectral bandpasses recommended for example by CIE algorithms and tables, and to measure the hyperspectral bandpasses. The resulting analog bandpass data are transmitted to the MDAs 17 via control lines 16. The data are next converted from analog to digital signals by ADCs 19 of FIG. 11. Then DSPs 18 calculate the percentage of the known white point value actually transmitted, or the relative light intensity for each pixel, and represent each intensity as a digital signal. This digital signal represents the relative intensity of a pixel's transmitted light, between 0% and 100% of the White Point, or the Relative Spectral Power Distribution of the pixel, often described in the literature as the calorimetric characteristic curve. Black point 0% and white point 100% intensities are respectively illustrated, for example, as a function of wavelength in FIG. 15. Curve 74 illustrates the electrical response of light sensor 35 of FIG. 13b when saturated by white light at a plurality of bandpasses ("white point"). Curve 75 illustrates the inherent electrical noise response of sensor 35 when provided with no light energy stimulus ("black point"). Curve 76 illustrates curves 74 and 75 calibrated to the spectral response of the light sensor, or the "normalized" intensity profile for white light. Accordingly, the normalized curve exhibits uniform intensity over a visible spectrum.

Dynamic range may be represented as a log ratio of an individual element of the linear light sensor's 35 electron well depth to the readout noise in decibels, dB. For example, a sensor element or sensor pixel with a well depth of 85,000 electrons and a readout noise of 12 electrons would have a dynamic range of 20log(85,000/12), or 77 dB. This ratio gives an indication of the number of digitization levels that are appropriate for a given sensor. A sensor with a well depth of 35,000 electrons and 15 electrons of noise would yield a ratio of 35,000/15=2,333, and a 12-bit ADC system with 4,096 levels would be adequate for the purposes of the present invention. A sensor with a well depth of 150,000 electrons and 15 electrons of readout noise would have a ratio of 10,000, or about 80 dB and a 14-bit ADC system with 16,384 levels would be adequate for the purposes of the present invention.

Next described is the transformation by MDAs 17 of FIG. 11 of pixel transmittance signals provided by sensors 35. The transformation algorithms are preferably incorporated in scanner application software 22 residing in the MDAs 17.

The disclosed system uses CIE-defined specifications to measure and transform objects such as pixel light into color values. The CIE system assumes that the Stimulus for Color is provided by the proper combination of a Source of Light, an Object, and an Observer. Some time ago the CIE, at set wavelength intervals calibrated in nanometers (nm), mathematically standardized Sources of Light via Power Distribution Tables for Standard Illuminants (S) and standardized Observers via Color Matching Function Tables for Standard Observers ($\bar{x}$, $\bar{y}$, and $\bar{z}$). The CIE also developed a methodology that uses Standardized Illuminants, Standardized Observers and the Relative Spectral Power Distribution (T) of the Object to derive numbers that are designated the Colorimetric Tristimulus Values X, Y and Z, and which provide a standard measure of an Object's color. This methodology is mathematically expressed as:

$$X = k \sum_{360}^{830} T_{(\lambda)} S_{(\lambda)} \bar{x}_{(\lambda)} \quad (1)$$

$$Y = k \sum_{360}^{830} T_{(\lambda)} S_{(\lambda)} \bar{y}_{(\lambda)} \quad (2)$$

$$Z = k \sum_{360}^{830} T_{(\lambda)} S_{(\lambda)} \bar{z}_{(\lambda)} \quad (3)$$

where $k$ is a normalization constant $$k = 100 \Big/ \sum_{360}^{830} S_{(\lambda)} \bar{y}_{(\lambda)} \quad (4)$$

and where specific tables for S, $\bar{x}$, $\bar{y}$, and $\bar{z}$ are all functions of the CIE-defined wavelength interval $_{(\lambda)}$, as are the bandpasses measured for T.

Through mathematical means (equations 1–4) using Scanner Application Software code optimized for the task, the relative amount of light a pixel transmits at the CIE-defined bandpasses (T) is multiplied, by a DSP, together with the operator-selected CIE standard values for "Illuminants" (S) and "Observers," ($\bar{x}$, $\bar{y}$, and $\bar{z}$), thus generating by summation three numerical values, the Tristimulus values X, Y and Z, that both represent the area under the Characteristic Curve and locate the color exhibited by the pixel's light in a three-dimensional color space designated XYZ by the CIE. Using further CIE-defined mathematical means (equations 5–10), the scanning application software uses a DSP to transform a pixel's Tristimulus values X, Y and Z into a new set of three values, now locating the pixel's color in the three-dimensional L*a*b* (CIELAB) color space, a device independent color space acknowledged to mathematically represent human color perception. The XYZ to CIELAB methodology is mathematically expressed as:

$$L^* = 116(Y/Y_n)^{1/3} - 16 \quad (5)$$

$$a^* = 500[(X/X_n)^{1/3} - (Y/Y_n)^{1/3}] \quad (6)$$

$$b^* = 200[(Y/Y_n)^{1/3} - (Z/Z_n)^{1/3}] \quad (7)$$

where:

$X/X_n$; $Y/Y_n$; $Z/Z_n > 0.01$ and $X_n$, $Y_n$, $Z_n$ are the Tristimulus values of the illuminant selected with $Y_n$ equal to 100 obtained by use of the same normalization method used to obtain X, Y, Z. When one or more of the ratios $X/X_n$, $Y/Y_n$, $Z/Z_n$ is less than 0.01 or if $Y/Y_n \leq 0.008856$ for $$L^* = 116(Y/Y_n)^{1/3} - 16 \quad (5)$$

Then $$L^* = 903.3(Y/Y_n) \text{ where } Y/Y_n \leq 0.008856 \quad (8)$$

and $$a^* = 500[f(X/X_n) - f(Y/Y_n)] \quad (9)$$

$$b^* = 200[f(Y/Y_n) - f(Z/Z_n)] \quad (10)$$

Where $f(X/X_n) = (X/X_n)^{1/3}$ when $X/X_n > 0.008856$ and
$f(X/X_n) = 7.787(X/X_n) + 16/116$ when $X/X_n \leq 0.008856$ and
$f(Y/Y_n) = (Y/Y_n)^{1/3}$ when $Y/Y_n > 0.008856$ and
$f(Y/Y_n) = 7.787(Y/Y_n) + 16/116$ when $Y/Y_n \leq 0.008856$ and
$f(Z/Z_n) = (Z/Z_n)^{1/3}$ when $Z/Z_n > 0.008856$ and
$f(Z/Z_n) = 7.787 (Z/Z_n) + 16/116$ when $Z/Z_n \leq 0.008856$.

With reference to FIG. 11, through connection 20, the CIELAB-encoded pixels, encoded by MDAs 17 according to the above described methods, are then passed to the host computer 1. An operator, through the scanner's GUI, may direct the host computer 1 to save the image in an associated storage device, for example, as CIELAB-encoded TIFF Data File 21, a format used extensively in graphical imaging.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

What is claimed is:

1. A scanner for creating a master for a graphical image, the scanner comprising:
 a light source to illuminate the graphical image;
 a collector to segment the graphical image into a plurality of pixels and to collect light emanating from the light source and from each of the plurality of pixels;
 a hyperspectral analyzer to divide the light from the source and the collected light from each of the plurality of pixels into a plurality of hyperspectral bandpasses, and to measure a light intensity for each of the plurality of hyperspectral bandpasses, wherein the plurality of hyperspectral bandpasses define a continuous spectrum characterized by wavelengths ranging between 360 and 830 nanometers, and wherein the divided light in each hyperspectral bandpass is characterized by a substantially unique and non-overlapping selection of continuous wavelengths from the spectrum;
 a calculator to transform the measured light intensities for the plurality of hyperspectral bandpasses of the source and the plurality of pixels into a device-independent representation of color;
 a processor with stored program control for formatting the device-independent representations for the plurality of pixels as a digital data file; and
 a memory for storing the formatted digital data file.

2. The scanner of claim 1, wherein the light source is a white light source generating light energy at continuous wavelengths that range between 360 and 830 nanometers.

3. The scanner of claim 2, wherein the light source is a xenon light source.

4. The scanner of claim 1, further comprising a diffuser to spread light from the light source to evenly illuminate the graphical image.

5. The scanner of claim 1, further comprising:
 a plurality of hyperspectral analyzers, each of the plurality of hyperspectral analyzers capable to divide collected light into a plurality of bandpasses and measure light intensity at each of the plurality of hyperspectral bandpasses for the source and ones of the plurality of pixels; and
 a plurality of calculators, each of the plurality of calculators transforming measured light intensities received from one of the plurality of hyperspectral analyzers into a device-independent representation of color.

6. The scanner of claim 5, wherein the collector further comprises:
 a lens system for focusing and establishing a spatial dimension for each of the plurality of pixels;
 a linear sensor for directing light from the source and ones of the plurality of pixels to the plurality of hyperspectral analyzers; and
 an image positioning device to direct light from the source to an optical path of the linear sensor, and to move the image to direct light from successive groupings of ones of the plurality of pixels to the optical path of the linear sensor, and thereby effect a pixel scanning resolution for the image.

7. The scanner of claim 6, wherein the linear sensor comprises a multi-fiber optic light sensing array including:
 a plurality of fiber optic light guides each having a core portion and a cladding portion, the core portion having a diameter of about 50 microns; and
 a harness for fixedly positioning the plurality of fiber optic light guides.

8. The scanner of claim 7, wherein the harness positions the plurality of fiber optic light guides such that their centerlines are axially separated by about 200 microns.

9. The scanner of claim 7, wherein the plurality of fiber optic light guides comprises 8 guides.

10. The scanner of claim 7, wherein the plurality of fiber optic light guides comprises 32 guides.

11. The scanner of claim 6, wherein the image positioning device further comprises:
 a platform for fixedly holding the graphical image;
 a drive mechanism operative to move the platform in at least X and Y directions; and
 a controller for operating the drive mechanism, said controller being operative to cause the drive mechanism to move in discrete steps for directing light from the source and the successive groupings of ones of the plurality of pixels.

12. The scanner of claim 5, wherein each of the plurality of hyperspectral analyzers comprises:
 a reflective grating for dispersing light from the source and each of the plurality of pixels into the plurality of hyperspectral bandpasses; and
 a light sensor for measuring an intensity for light dispersed into each of the plurality of hyperspectral bandpasses and outputting an electrical signal representative of the measured intensity.

13. The scanner of claim 12, wherein the light sensor comprises a linear array selected from the group consisting of charge-coupled device (CCD) sensors, complimentary metal oxide semiconductor (CMOS) sensors and diode sensors.

14. The scanner of claim 12, wherein each of the plurality of calculators comprises:
 a converter for receiving an electrical signal from a light sensor for the source and for ones of the plurality of pixels for each of the plurality of bandpasses, and transforming the electrical signal into a digital intensity value;
 a memory for storing digital intensity values for the plurality of bandpasses of the source and ones of the plurality of pixels together with tables of standard device-independent color parameters for each bandpass; and
 a signal processor with stored program control for using standard device-independent color transformation algorithms together with the stored digital intensity values of the plurality of bandpasses of the source and ones of the plurality of pixels and tables of standard device-independent color parameters for each bandpass to compute a device-independent color representation for the pixel.

15. The scanner of claim 14, wherein the converters comprise analog-to-digital converters and the signal processors comprise digital signal processors.

16. The scanner of claim 5, further comprising a user interface, wherein the processor operates to control one or more of the plurality of collectors, the plurality of hyperspectral analyzers and the plurality of calculators in response to commands received at the user interface.

17. The scanner of claim 16, wherein the user interface comprises a graphical user interface.

18. The scanner of claim 17, wherein the plurality of calculators transform the device-independent color representations into a device-dependent form for display by the graphical user interface.

19. The scanner of claim 1, wherein the light source is configured to reflect light energy off of the graphical image.

20. The scanner of claim 1, wherein the light source is configured to transmit light energy through the graphical image.

21. A method for creating a master of a graphical image in a device-independent form, the method comprising the steps of:

illuminating the graphical image with a light source;

segmenting the graphical image into a plurality of pixels;

collecting light emanating from each of the plurality of pixels and from the source;

dividing the collected light into a plurality of hyperspectral bandpasses for each of the source and the plurality of pixels, wherein the plurality of hyperspectral bandpasses define a spectrum characterized by wavelengths ranging continuously between 360 and 830 nanometers, and wherein the divided light in each hyperspectral bandpass is characterized by a substantially unique and non-overlapping selection of continuous wavelengths from the spectrum;

measuring a light intensity for each of the plurality of hyperspectral bandpasses;

transforming the measured light intensities for the plurality of spectral bandpasses into a device-independent representation of color;

formatting the device-independent representations for the plurality of pixels as a digital data file; and storing the formatted digital data file.

22. The method of claim 21, wherein the transforming step comprises the step of normalizing the measured light intensities for each of the plurality of spectral bandpasses for the plurality of pixels with reference to a maximum light intensity value (white point) and a minimum light intensity value (black point).

23. The method of claim 22, wherein the white point intensity value for a spectral bandpass is determined by measuring a value from a light intensity sensor that has been saturated with light in the spectral bandpass from the light source, and the black point intensity value for a spectral bandpass is determined by measuring an electronic noise level value of the light intensity sensor.

24. The method of claim 21, wherein the device-independent representation of color comprises device-independent tristimulus values and chromaticity coordinates.

25. The method of claim 24, wherein the device-independent color representation is provided in a CIE XYZ color space and a CIE xyY color space.

26. The method of claim 25, wherein the device-independent representation of color is further transformed into a derivative device-independent color space selected from the group consisting of CIELAB, CIELUV and CIELCH color spaces.

27. The method of claim 25, wherein the digital data file formats a CIELAB color space representation of the image in a TIFF format.

28. The method of claim 21, wherein the collecting step is performed substantially simultaneously for ones of the plurality of pixels.

29. The method of claim 28, wherein dividing, measuring and transforming steps are performed in a parallel manner for the ones of the plurality of pixels.

* * * * *